United States Patent [19]

Steinhage et al.

[11] 4,199,218
[45] Apr. 22, 1980

[54] WARM LIGHT REFLECTOR

[75] Inventors: Peter-Wilhelm Steinhage, Wiesbaden; Claus Kunze, Taunusstein, both of Fed. Rep. of Germany

[73] Assignee: Heimann GmbH, Fed. Rep. of Germany

[21] Appl. No.: 924,164

[22] Filed: Jul. 13, 1978

[30] Foreign Application Priority Data

Jul. 28, 1977 [DE] Fed. Rep. of Germany ....... 2734142

[51] Int. Cl.² .............. G02B 13/14; G02B 5/20
[52] U.S. Cl. .................... 350/1.7; 250/504
[58] Field of Search .......... 250/495, 496, 503, 504, 250/510; 350/1.7, 288, 290

[56] References Cited

U.S. PATENT DOCUMENTS

| 2,564,708 | 8/1951 | Mochel | 350/1.7 |
| 3,531,313 | 9/1970 | Dates | 350/1.7 |
| 4,082,413 | 4/1978 | Austin et al. | 350/1.7 |

FOREIGN PATENT DOCUMENTS 599675 3/1948 United Kingdom ............ 350/1.7
1335410 10/1973 United Kingdom .

OTHER PUBLICATIONS

"Infrared Filters using Evaporated Layer of Lead Sulfide, Lead Solenoide, and Lead Telluride", Braithwaite, Jour. of Sci. Ins., vol. 32, Jan. 1955, pp. 10–11, 350–1.7.

*Primary Examiner*—Bruce C. Anderson
*Attorney, Agent, or Firm*—Hill, Van Santen, Steadman, Chiara & Simpson

[57] ABSTRACT

The invention relates to a "warm light reflector", which reflects infrared radiation and absorbs visible light. More specifically, a reflecting layer of, for example, gold carries a double layer of PbS, which is constructed of one smooth layer and of one fine-flocked layer of agglomerates.

The disclosed warm light reflector finds particular application in infrared measurement technology, preferably in a passive infrared alarm generator.

3 Claims, 3 Drawing Figures

WARM LIGHT REFLECTOR

INTRODUCTION

The invention relates to a warm light reflector which relfects electromagnetic waves above a limiting wavelength in the infrared range and absorbs those which are below, and a process for the production of a warm light reflector of this kind, as well as a utilization thereof.

BACKGROUND OF THE INVENTION

A reflector which reflects only light radiation with wavelengths above a limiting wavelength usually lying in the infrared range is designated as a warm light reflector. The radiation below the limiting wavelength is either absorbed or transmitted. Reflectors of this kind are required for optical applications with selective reflection behavior, particularly in infrared measurement technology, for example, as high-pass filters in imaging reflector systems which are not to be influenced by visible light.

SUMMARY OF THE INVENTION

The present invention has the underlying objective of creating a warm light reflector of this kind with absorption below the limiting wavelength, and of indicating a process for its production, as well, as utilization.

For accomplishing this objective, this invention provides a warm light reflector, which reflector includes a coating of lead sulfide on the reflecting surface.

For an advantageous refinement, the coating consists of two layers, one on top of the other, with the first being a metallically brilliant layer of lead sulfide and the second being a finely-flocked layer of individual agglomerates of lead sulfide. The reflector itself can be non-selective.

It is further proposed, for the production of an inventive warm light reflector, that a smooth, metallically brilliant layer of lead sulfide be deposited on the reflector first, and subsequently a finely-flocked layer of individual agglomerates of lead sulfide are vapor-deposited thereon. The vapor deposition advantageously occurs in a vacuum of approximately $10^{-5}$ torr with constant vapor depositing rate.

Further, the invention includes the provision of means for a novel warm light reflector in the optical focusing device of a passive infrared alarm generator, in which an infrared radiation detector has a radiation filter which keeps visible light away from the detector, but could trigger false alarms as a consequence of absorption and emission of characteristic radiation.

The warm light reflector reflects electromagnetic waves with wavelengths above 2 μm as limiting wavelength, and absorbs electromagnetic waves with a shorter wavelength, to a great degree.

BRIEF DESCRIPTION OF THE DRAWINGS

With the aid of the Figures of the drawing, the invention will be further explained.

DESCRIPTION OF THE PREFERRED EMBODIMENTS

Figure 1:
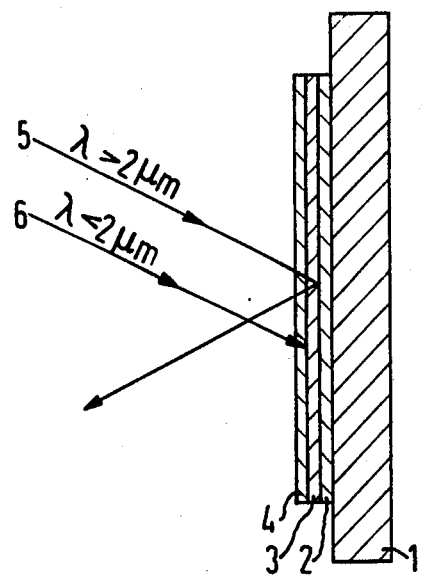
FIG. 1 is a schematic section through a preferred embodiment of a warm light reflector.

In FIG. 1, 1 designates the metallic carrier of a gold layer 2, which together form an imaging reflector. The carrier 1 can also consist of glass or ceramic material. On the gold layer 2 is deposited a smooth, metallically brilliant layer 3 of lead sulfide, vapor-deposited thereon is a finely-flocked layer 4 of individual agglomerates of lead sulfide. The coating with gold, as well as with aluminum, for example, reflects to a high degree. The lead sulfide layer as a preferred double layer 3, 4 has a dark black appearance in the range of visible light. For radiation 5 above the limiting wavelength of 2 μm the lead sulfide layer 3, 4 is completely permeable, so that the reflection behavior is determined only by the reflecting coating 2. Radiation 6 with wavelengths below the limiting wavelength of 2 μm is essentially absorbed. By means of the black coating the portion reflected by the lead sulfide layer 3, 4 is small, in spite of lead sulfide's high refractive index of 3.9.

Figure 2:
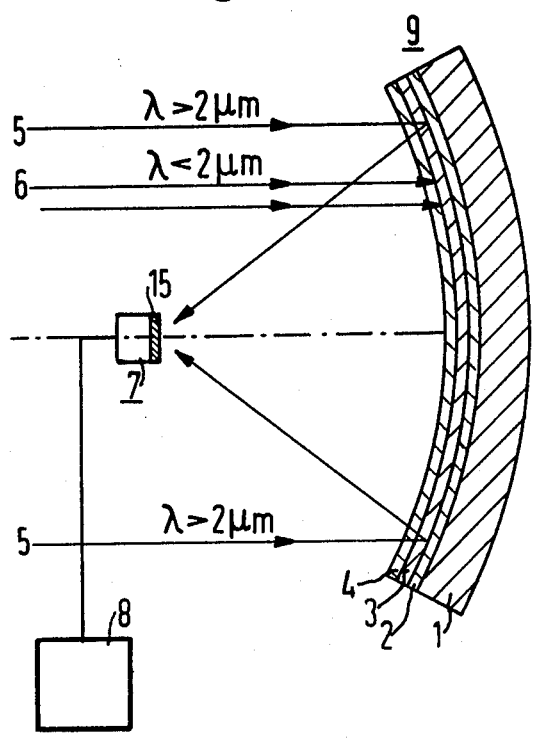
FIG. 2 is a warm light reflector and shows an imaging reflector in a passive infrared alarm generator.

FIG. 2 schematically shows a passive infrared alarm generator, such as is used for space monitoring against intruders, said alarm generator having a warm light reflector of the present invention as a reflector element. For that purpose, the warm light reflector, with the carrier 1, gold layer 2 and the lead sulfide layers 3, 4, is embodied as a concave mirror 9 which selectively focuses parallel incident rays 5, 6 onto an infrared radiation detector 7 with a radiation filter 15 at the entry window. Above the limiting wavelength of 2 μm, rays 5 are transmitted by the lead sulfide layers 3, 4 and reflected from the gold layer 2. Below the said limiting wavelength, rays 6 are absorbed in the lead sulfide layers 3, 4. In this way, it is assured that these rays are kept away from the radiation filter 15 of the detector 7. A heating-up as a result of absorption in the radiation filter 15 located on the entry window of the detector 7, and the possibility, in conjunction therewith, of a false alarm as a result of emitted characteristic radiation of this radiation filter 15 in the infrared range is thus precluded. The infrared radiation is converted, by the detector 7, into an electrical signal which is processed, in an evaluation device 8, into a possible alarm signal. This occurs, for example, as is known from British Specification 1,335,410 (corresponding to German AS No. 21 03 909), by recognition of a change in the infrared radiation with a frequency of 0.2 to 5 Hz, characteristic of the movement of an intruder during entry into or departure from the monitored space angle. Slower temperature changes, for instance, as a result of heating-up of the room or rapid temperature changes, for instance as a result of insects flying past, are not registered. In the passivity of the alarm generator lies the foundation of the advantage that no active signal affords a possibility of discovering the alarm generator.

Figure 3:
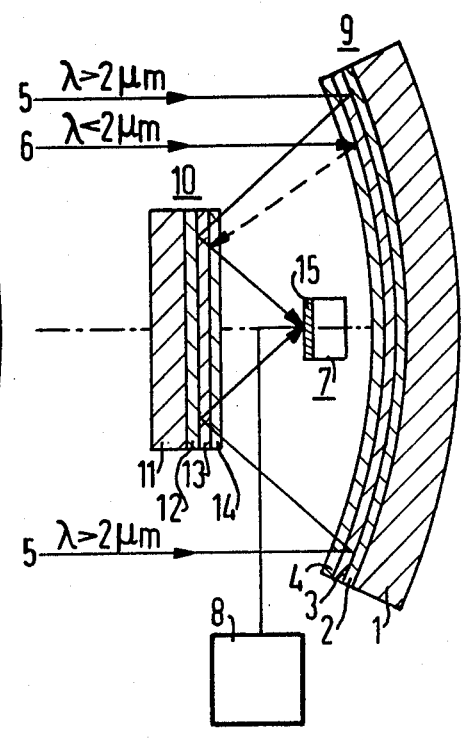
FIG. 3 illustrates a different embodiment with a so-called folded optic.

FIG. 3 schematically shows an elaboration of the embodiment of FIG. 2. By means of a so-called folded optic not only the constructional length of the alarm generator is reduced. The possibility of offering the incident rays two selective absorption possibilities increases the selection effect, and thus, the protection for the radiation filter 15 of the infrared radiation detector 7.

An inventive warm light reflector consists, according to FIG. 3, of an imaging reflector in the form of a concave reflector 9, again formed of a metallic carrier 1, a gold layer 2 and lead sulfide layers 3, 4. This concave reflector 9 reflects parallel incident radiation selectively onto the inventive warm light reflector, embodied as a plane reflector 10, with a metallic carrier 11, gold layer 12 and lead sulfide layers 13, 14. The plane reflector 10 selectively reflects the radiation received from the concave reflector 9 onto the infrared radiation detector 7 which provides the conversion into an electrical signal and passes it along to the evaluation device 8. In case the rays 6 below 2 m wavelength are not completely absorbed by the layers 3, 4 of the concave mirror 9, this is taken care of by layers 13, 14 of the plane mirror 10. The alarm generator's freedom from interference is thus increased.

It will be apparent to those skilled in the art that many modifications and variations may be effected without departing from the spirit and scope of the novel concepts of the present invention.

We claim as our invention:

1. A warm light reflector which reflects electromagnetic waves above a predetermined limiting wavelength lying in the infrared range and which absorbs those lying below said predetermined minimum wavelength, said reflector carrying a coating of lead sulfide on the reflecting surface thereof, said coating consisting of two layers lying one on top of the other, with said first layer being a metallically brilliant layer of lead sulfide, and said second layer being a finely-flocked layer of individual agglomerates of lead sulfide.

2. A warm light reflector which reflects electromagnetic waves above a predetermined limiting wavelength lying in the infrared range and which absorbs those lying below said predetermined minimum wavelength, comprising a reflecting layer of gold and a double layer of lead sulfide on said reflecting layer of gold, one of said lead sulfide layers being a metallically brilliant smooth layer, and the other of said lead sulfide layers being a finely-flocked layer of agglomerates of lead sulfide.

3. A warm light reflector which reflects electromagnetic waves above a predetermined limiting wave length lying in the infrared range and which absorbs those lying below said predetermined minimum wavelength, comprising an image reflector in the form of a concave reflector formed of a metallic carrier, a gold layer on said carrier, and first and second lead sulfide layers on said gold carrier, in which one of said lead sulfide layers is formed of polished lead sulfide, and in which said other layer of lead sulfide is finely-flocked agglomerates of lead sulfide.

* * * * *